G. W. STOCKHAM.
CORN PLOW.
APPLICATION FILED MAY 13, 1915.
1,209,066.
Patented Dec. 19, 1916.
4 SHEETS—SHEET 3.
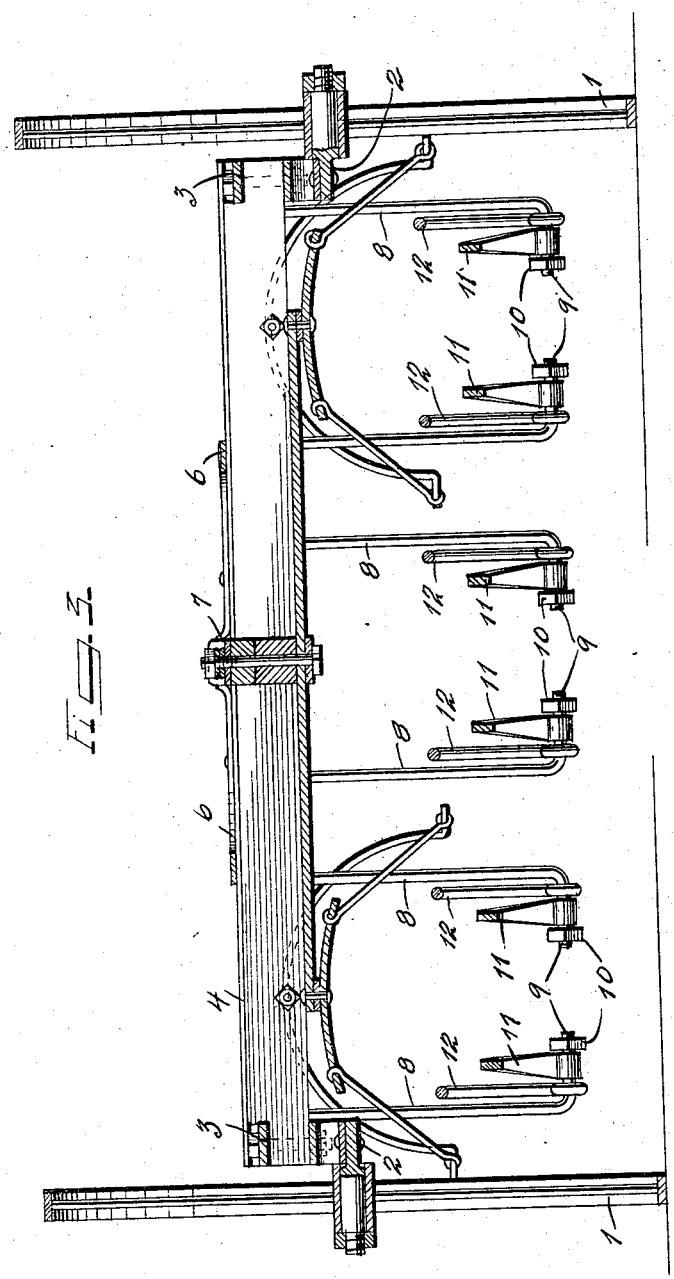
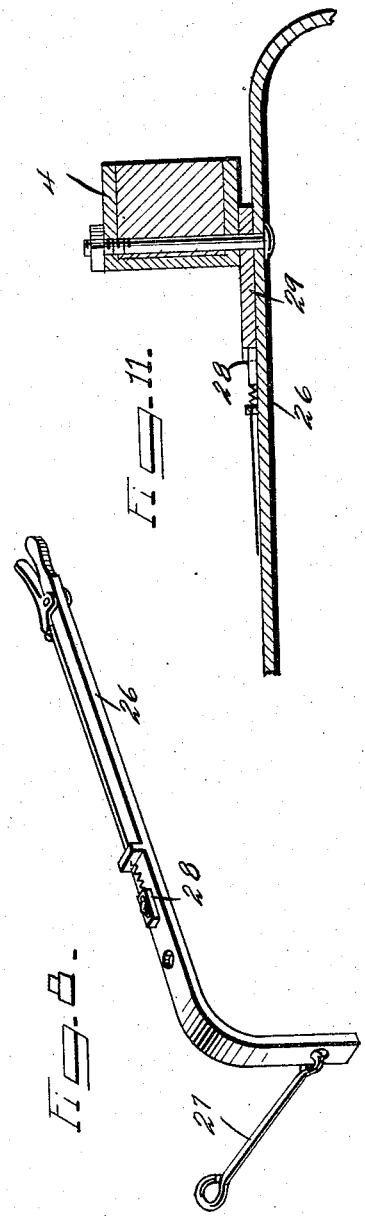
Witnesses
Inventor
G. W. Stockham
By
his Attorneys

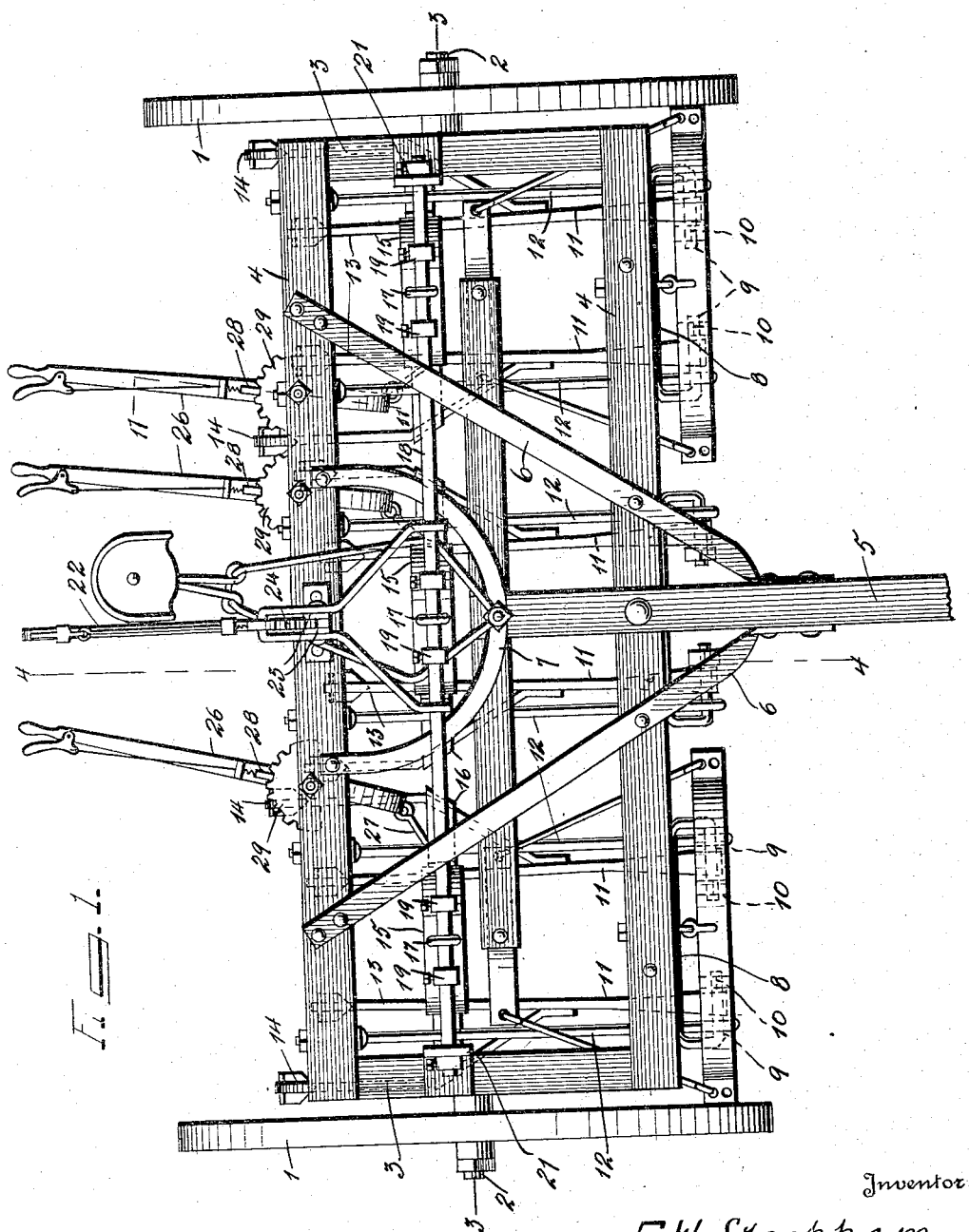

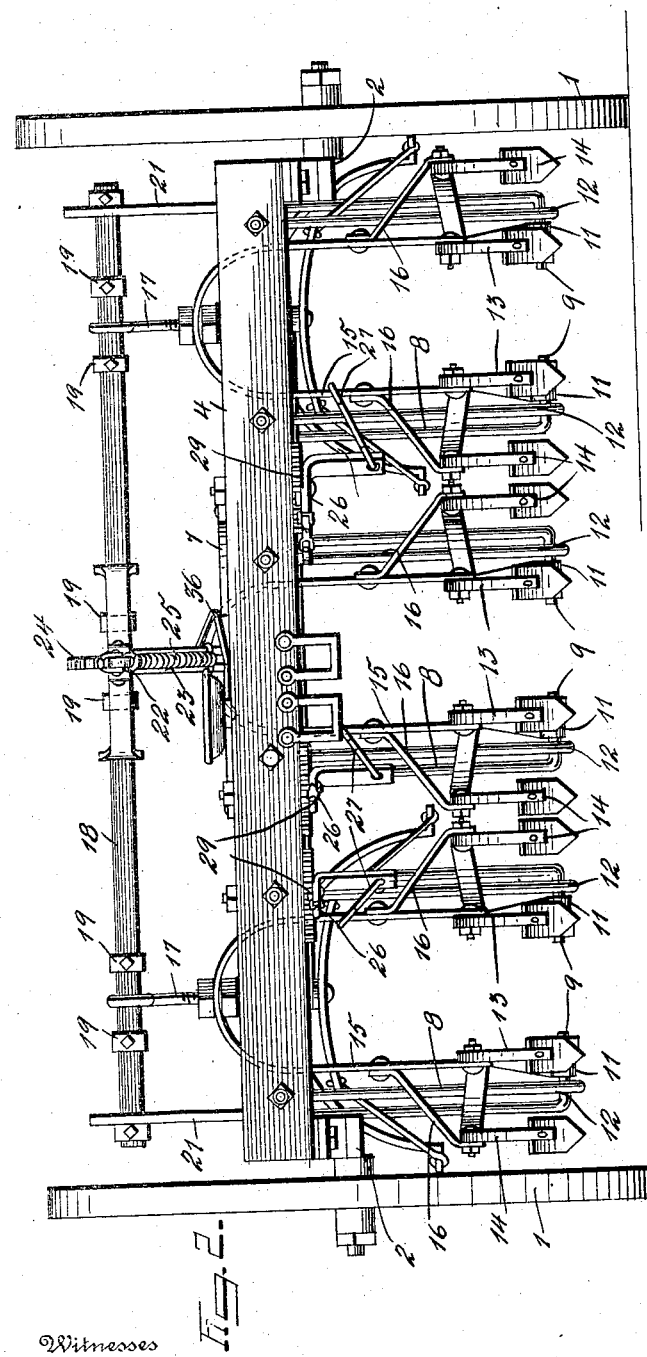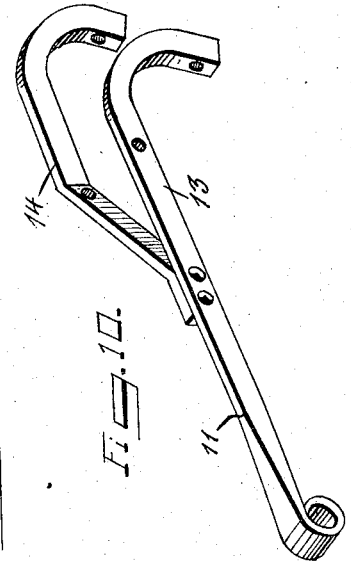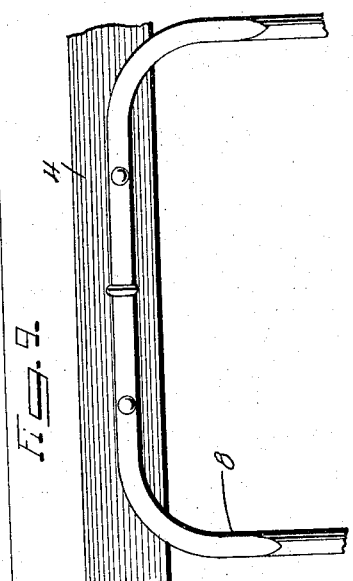

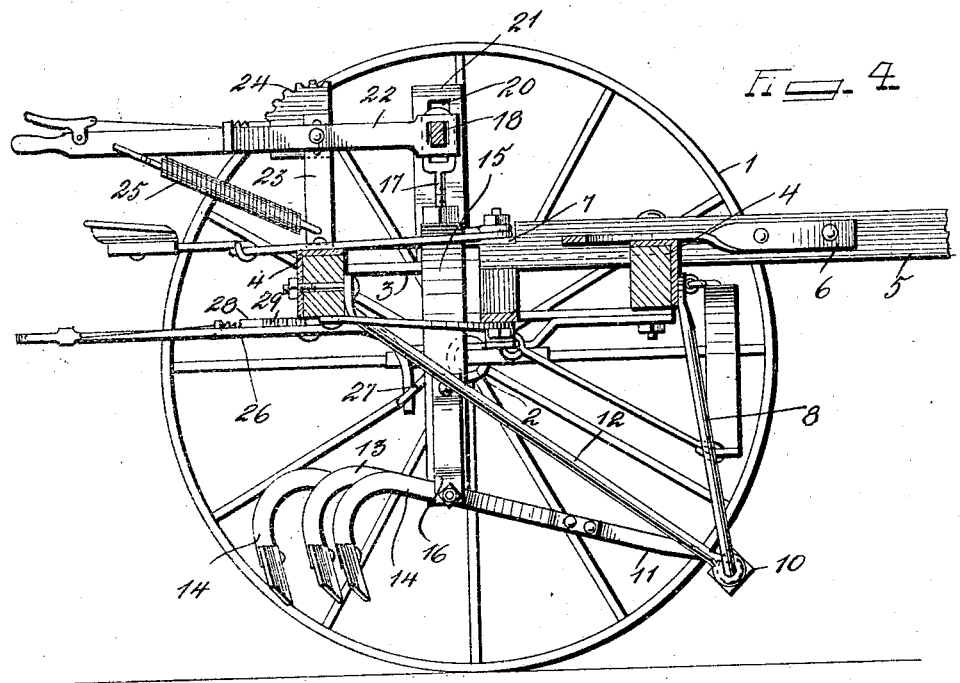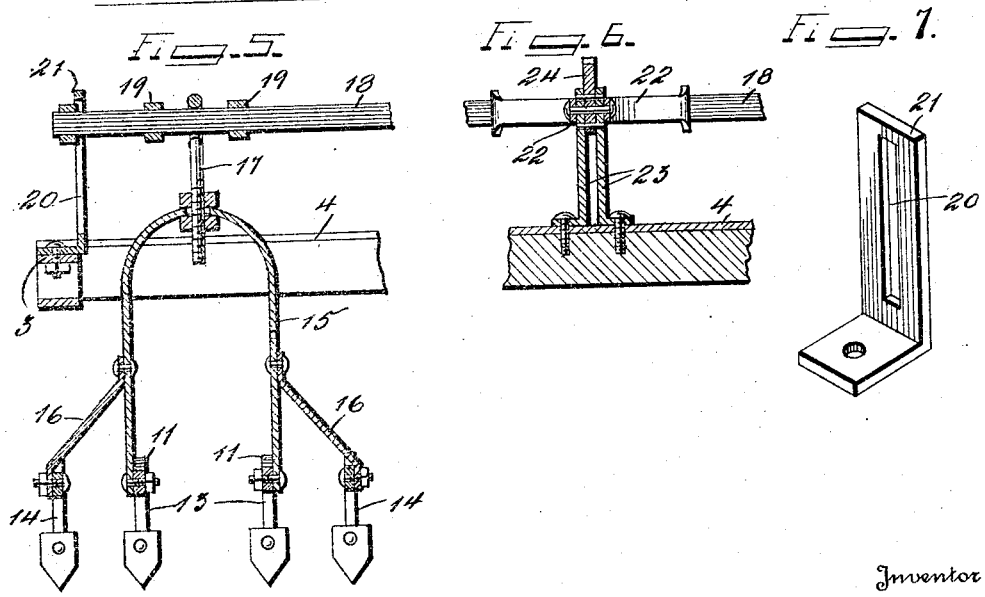

UNITED STATES PATENT OFFICE.

GEORGE W. STOCKHAM, OF MANKOTA, KANSAS.

CORN-PLOW.

1,209,066.   Specification of Letters Patent.   Patented Dec. 19, 1916.

Application filed May 13, 1915. Serial No. 27,900.

*To all whom it may concern:*

Be it known that I, GEORGE W. STOCKHAM, a citizen of the United States of America, residing at Mankota, in the county of Jewell and State of Kansas, have invented certain new and useful Improvements in Corn-Plows, of which the following is a specification, reference being had therein to the accompanying drawing.

This invention relates to corn plows and the like, and has for its object the production of a simple and efficient plow of the gang plow type, wherein a plurality of plow beams are supported or hung upon a frame so as to be readily thrown into and out of an operative position.

A still further object of this invention is the production of a simple and efficient means for controlling the lateral movement of the plow beams to the desired position for the purpose of facilitating the plowing of the ground between the several rows of corn.

With these and other objects in view this invention consists of certain novel combinations, constructions, and arrangements of parts as will be hereinafter fully described and claimed.

In the accompanying drawings: Figure 1 is a top plan view of the plow. Fig. 2 is a rear elevation thereof. Fig. 3 is a section taken on line 3—3, of Fig. 1. Fig. 4 is a section taken on line 4—4, of Fig. 1. Fig. 5 is a vertical section through one series of the plow supporting yokes. Fig. 6 is a vertical section taken through the supporting standard which carries the lever for raising and lowering the plow beams. Fig. 7 is a perspective view of one of the guiding brackets carried by the frame of the plow. Fig. 8 is a perspective view of one of the operating levers for controlling the lateral movement of the plow beams. Fig. 9 is a front elevation of one of the upper ends of the supporting yokes for engaging the ends of the plow beams. Fig. 10 is a perspective view of one of the plow beams. Fig. 11 is a sectional view taken on line 11—11, of Fig. 1.

By referring to the drawings it will be seen that 1 designates the supporting wheels, which supporting wheels engage the stub axles 2. These stub axles 2 support the longitudinally extending end beams 3 of the main frame, which beams 3 engage the transversely extending front and rear beams 4. A draft tongue or pole 5 is carried by the frame and is braced by means of the diverging braces 6 as clearly illustrated in Fig. 1. The rear end of the pole or tongue 5 is also braced by means of an arc-shaped brace 7 clearly illustrated in Fig. 1.

A plurality of substantially inverted U-shaped hanger yokes 8 are secured to the forward beam 4 of the main frame, and these yokes are provided with inwardly extending ends 9, which ends carry the nuts 10, which nuts are threaded thereon. A plow beam 11 has its forward end secured to each of the inwardly extending ends 9 of the yokes 8, thereby causing each supporting yoke 8 to support or engage two plow beams 11. A plurality of rearwardly extending inclined braces 12 also engage the inwardly extending ends 9 of the yoke frames 8 and constitute efficient braces therefor for resisting the rearward pulling movement of the plow beams 11.

Each plow beam comprises a main portion 13 having an auxiliary beam 14 secured thereto. These auxiliary beams 14 are so placed as to have the auxiliary beam of each pair to extend upon the opposite side of the main beam as illustrated clearly in Fig. 5.

A hanger yoke 15 engages each pair of plow beams, and these hanger yokes 15 are provided with auxiliary hanger bars 16 carried by the side thereof for engaging the auxiliary portions of the plow beam. This structure is clearly illustrated in Fig. 2 of the drawings.

The hanger yokes 15 carry supporting eyes 17 at the upper ends thereof, which supporting eyes engage a supporting bar 18, the supporting bar 18 extending transversely of the main frame of the corn plow. A plurality of adjusting collars 19 are placed in spaced relation upon the bar 18 so as to limit the lateral movement of the supporting yokes 15. The supporting bar 18 is adapted to have a vertical sliding movement in the longitudinally extending slots 20 formed in the supporting or guide plates or brackets 21. These brackets or guide plates 21 are carried by the ends of the frame of the corn plow. An operating lever 22 is pivotally supported upon a supporting standard 23, which supporting standard carries a quadrant 24. The operating lever 22 engages the bar 18 and in this manner facilitates the raising and lowering of the corn plow to the desired position. A coil spring 25 engages the standard 23 and the lever 22 for normally causing the free end of the lever to be drawn downwardly and also facilitates the raising and holding of the plow beams 11 in an inoperative position.

Each yoke 15 is engaged by means of a lateral swinging lever 26 whereby each pair of plow beams may be shifted laterally to the desired position to conform to the rows of corn which are planted in the field. The levers 26 are connected to the yokes 15 by means of links 27, and the levers 26 also carry spring pressed dogs 28 which engage the quadrant 29 carried by the main frame of the plow.

From the foregoing description it will be seen that a very simple and efficient device has been produced for controlling the lateral adjustment of the plow beams whereby the field may be easily and conveniently plowed between the rows of corn, and at the same time allow the plow beams to be shifted both laterally and vertically when so desired.

The inner end of the lever 22 above described is forked so as to straddle or extend laterally in two prongs for conveniently engaging the beam 18 to facilitate the operation of this beam.

Having thus described the invention what is claimed as new, is:—

1. In a corn plow of the class described, the combination of a frame, means for supporting said frame, said frame comprising a pair of longitudinal beams, a pair of transversely extending beams carried thereon, inverted U-shaped supporting yokes carried upon the forward transversely extending beams, the sides of each yoke extending inwardly at its lower end to provide inwardly extending ends, plow beams pivotally mounted upon said inwardly extending ends, whereby each yoke may support a pair of plow beams, inclined braces secured to said inwardly extending ends and to the rear transversely extending beams, whereby said yokes will be held against rearward movement, means for vertically adjusting said plow beams, and means for adjusting said plow beams in a horizontal plane.

2. In a corn plow of the class described, the combination of a frame, supporting yokes carried upon said frame, plow beams pivotally mounted upon said supporting yokes, hanger yokes secured to said supporting yokes, means for adjusting said plow beams in a horizontal plane, a lifting bar extending entirely across the upper portion of said frame, means for adjusting said lifting bar in a vertical plane, and means secured to said hanger yokes and connected to said lifting bar for lifting said hanger yokes as said lifting bar is lifted, whereby said plow beams may be lifted, said last-mentioned means being adapted to slide along said lifting bar as said plow beams are adjusted in a horizontal plane.

3. In a corn plow of the class described, the combination of a frame, supporting said frame, plow beams yokes carried by said frame, plow beams pivotally mounted upon said supporting yokes, hanger yokes secured to said plow beams, a lifting bar extending entirely across the upper portion of said frame, means for adjusting said lifting bar in a vertical plane, a supporting eye secured to each of said hanger yokes, said eyes embracing said lifting bar so as to slide thereon when said plow beams are adjusted in a horizontal plane, said supporting eyes being adapted to lift said plow beams as said lifting bar is elevated, and means for limiting the sliding movement of said eyes upon said lifting bar as said plow beams are swung in a horizontal plane.

4. In a corn plow of the class described, the combination of a frame, supporting yokes carried by said frame, plow beams pivotally mounted upon said supporting yokes, hanger yokes secured to said plow beams, a lifting bar extending entirely across the upper portion of said frame, means for adjusting said lifting bar in a vertical plane, a supporting eye secured to each of said hanger yokes, said eyes embracing said lifting bar so as to slide therefrom when said plow beams are adjusted in a horizontal plane, said supporting eyes being adapted to lift said plow beams as said lifting bar is elevated, collars embracing said lifting bar and being slidably mounted thereon, means for holding said collars in adjusted set positions, said collars being positioned upon each side of said eyes, whereby the movement of said eyes along said lifting bar will be limited.

In testimony whereof I hereunto affix my signature.

GEORGE W. STOCKHAM.